(12) United States Patent
Plewnia et al.

(10) Patent No.: US 8,419,383 B2
(45) Date of Patent: Apr. 16, 2013

(54) PISTON PUMP AND OPERATING METHOD THEREFOR

(75) Inventors: Heinrich Plewnia, Niederhofen (DE); Werner Seibert, Kammerforst (DE)

(73) Assignee: Lucas Automotive GmbH, Koblenz (DE)

(*) Notice: Subject to any disclaimer, the term of this patent is extended or adjusted under 35 U.S.C. 154(b) by 396 days.

(21) Appl. No.: 12/669,248

(22) PCT Filed: Jul. 2, 2008

(86) PCT No.: PCT/EP2008/005407
§ 371 (c)(1),
(2), (4) Date: Apr. 15, 2010

(87) PCT Pub. No.: WO2009/010191
PCT Pub. Date: Jan. 22, 2009

(65) Prior Publication Data
US 2010/0202903 A1    Aug. 12, 2010

(30) Foreign Application Priority Data
Jul. 17, 2007   (DE) .................. 10 2007 033 244

(51) Int. Cl.
*F04B 1/04*     (2006.01)
*F04B 11/00*    (2006.01)

(52) U.S. Cl.
USPC ........................................ 417/273; 417/539

(58) Field of Classification Search .............. 417/273, 417/539, 326, 44.1, 63, 423.3; 303/10, 116.3, 303/116.4; 92/61, 72, 148; 123/193.5
See application file for complete search history.

(56) References Cited

U.S. PATENT DOCUMENTS

| | | | | |
|---|---|---|---|---|
| 2,141,057 A | * | 12/1938 | Whiles | 417/248 |
| 2,628,015 A | * | 2/1953 | Neugebauer et al. | 417/203 |
| 2,697,403 A | * | 12/1954 | Benedek | 417/439 |
| 3,191,544 A | * | 6/1965 | Szekely | 417/273 |
| 3,496,880 A | * | 2/1970 | Wolff | 92/72 |
| 3,667,868 A | * | 6/1972 | Brunner | 17/273 |
| 5,009,580 A | * | 4/1991 | Maru | 417/533 |
| 5,127,805 A | * | 7/1992 | Fallis et al. | 417/273 |
| 5,465,817 A | * | 11/1995 | Muscatell | 188/295 |

(Continued)

FOREIGN PATENT DOCUMENTS

| | | |
|---|---|---|
| CH | 374042 A | 12/1963 |
| DE | 1045806 B | 12/1958 |

(Continued)

*Primary Examiner* — Devon Kramer
*Assistant Examiner* — Alexander Comley
(74) *Attorney, Agent, or Firm* — MacMillan, Sobanski & Todd, LLC

(57) ABSTRACT

A piston pump housing for a hydraulic pressure generator in a vehicle brake system includes a housing, in which a bore for receiving an eccentric shaft is formed. In the housing at least six cylinders for receiving one pump piston each are further provided. The cylinders are disposed in pairs in three or more mutually spaced-apart planes and open out in each case into the receiving bore for the eccentric shaft. According to a possible realization, in a two-circuit vehicle brake system at least three cylinders are associated with each brake circuit to increase the operating comfort. To reduce wear, each of the provided eccentrics interacts with only two pump pistons.

17 Claims, 5 Drawing Sheets

U.S. PATENT DOCUMENTS

| | | | |
|---|---|---|---|
| 6,446,435 B1 * | 9/2002 | Willmann et al. | 60/533 |
| 6,672,686 B2 * | 1/2004 | Lubischer | 303/116.4 |
| 6,971,858 B2 * | 12/2005 | Ahn | 417/273 |
| 7,281,519 B2 * | 10/2007 | Schroeder et al. | 123/445 |
| 7,766,626 B2 * | 8/2010 | Pabst et al. | 417/273 |
| 2003/0234574 A1 * | 12/2003 | Reuter et al. | 303/116.2 |
| 2004/0136837 A1 * | 7/2004 | Ganser et al. | 417/273 |
| 2007/0020131 A1 * | 1/2007 | Schroeder et al. | 417/521 |
| 2007/0041850 A1 * | 2/2007 | Ganzel | 417/273 |
| 2007/0110590 A1 * | 5/2007 | Pabst et al. | 417/273 |
| 2007/0176484 A1 * | 8/2007 | Reuter et al. | 303/10 |
| 2008/0191549 A1 * | 8/2008 | Giering et al. | 303/116.4 |

FOREIGN PATENT DOCUMENTS

| | | |
|---|---|---|
| DE | 1860919 U | 10/1962 |
| DE | 4229969 A1 | 3/1994 |
| DE | 19961851 A1 | 6/2001 |
| DE | 10345406 A1 | 4/2004 |
| DE | 10322604 A1 | 12/2004 |
| DE | 103 53 834 A1 * | 6/2005 |
| DE | 102005046619 A1 | 4/2007 |
| WO | 9964283 A1 | 12/1999 |
| WO | 2006061178 A1 | 6/2006 |
| WO | 2007024636 A2 | 3/2007 |

* cited by examiner

PISTON PUMP AND OPERATING METHOD THEREFOR

CROSS-REFERENCE TO RELATED APPLICATIONS

This application is a national stage of International Application No. PCT/EP2008/005407 filed Jul. 2, 2008, and which claimed priority to German Patent Application No. 10 2007 033 244.2 filed Jul. 17, 2007, the disclosures of both of which are incorporated herein by reference.

BACKGROUND OF THE INVENTION

The present invention relates generally to the generation of hydraulic pressure in a vehicle brake system. In particular the invention is geared to a hydraulic pump comprising at least six cylinder/piston arrangements.

Modern hydraulic or electrohydraulic vehicle brake systems require reliable pressure generators in order to be able to implement safety-relevant functions such as antilock brake control or traction control. In the case of these functions a hydraulic pressure for controlling one or more wheel brakes is generated by means of the pressure generator.

Such a pressure generator is known for example from WO 2006/061178 A1, and corresponding U.S. Patent Application Publication No. 2008/191549A1, both of which are incorporated herein by reference. The pressure generator comprises a piston pump as well as an electromotive actuator for actuating the piston pump. The piston pump possesses a housing, in which a plurality of cylinder bores for receiving one pump piston each are formed.

Depending on the form of construction, the piston pump described in WO 2006/061178 A1 comprises 5, 6, 8 or more cylinder/piston arrangements. In the case of a multi-circuit vehicle brake system, the individual cylinder/piston arrangements may be divided into a plurality of sets and each set may be associated with one hydraulic circuit each. In this case, the more cylinder/piston arrangements provided per set, the lower the pressure pulsations arising during control interventions and hence the greater the operating comfort.

From WO 99/64283 and corresponding U.S. Pat. No. 6,446,435 B1, both of which are incorporated herein by reference, it is known to provide one set of three cylinder/piston arrangements per hydraulic circuit. The three cylinder/piston arrangements of each hydraulic circuit are in this case disposed in a star-shaped manner within one plane. The two planes thus arising are disposed parallel to one another and penetrated at right angles by a common eccentric shaft. The electromotively driven eccentric shaft interacts in a known manner with the pistons preloaded in the direction of the eccentric shaft in order to deliver hydraulic fluid to the wheel brakes or away from the wheel brakes.

The underlying object of the invention is to prolong the service life of the known multi-piston pumps whilst maintaining the operating comfort.

BRIEF SUMMARY OF THE INVENTION

According to a first aspect this object is achieved by a piston pump housing for a hydraulic pressure generator in a vehicle brake system, wherein the housing comprises a bore for receiving an eccentric shaft as well as at least six cylinders for receiving one pump piston each and wherein the cylinders are disposed in pairs in at least three mutually spaced-apart planes and open out in each case into the bore.

If the piston pump housing is designed with eight, ten or more cylinders, the number of cylinder planes rises accordingly to four, five or more. As a separate eccentric may be provided for the two pump pistons of each plane, the eccentric wear is reduced compared to the multi-piston pumps of prior art having three, five or even eight pump pistons per plane and eccentric.

The six cylinders provided in the piston pump housing are divisible into two cylinder sets. In each case three cylinders disposed on different planes may then form a particular set. If the housing comprises more than six cylinders, the supernumerary cylinders may likewise be apportioned to the two cylinder sets or however form a third or fourth cylinder set and so on. Thus, it is for example conceivable for the first set of cylinders to be associated with a first brake circuit and for the second set of cylinders to be associated with a second brake circuit. An optionally provided third set of cylinders may be provided for brake boosting. The cylinders of each set may open out into a common fluid port.

For three or more cylinders disposed on different planes a common fluid channel that connects the individual cylinders to one another may be provided. There is the possibility of disposing the individual cylinders in such a manner relative to one another that the fluid channel runs in a straight line. A fluid channel running in a straight line may be realized by a single bore. It is also conceivable to provide two (or more) fluid channels running in a straight line, wherein the first fluid channel then connects the cylinders of the first set to one another and the second fluid channel connects the cylinders of the second set to one another.

Each fluid channel may have two opposite ends. A first end may be closed by means of a separate closure element or take the form of the base of a blind hole. At its end opposite the first end each fluid channel may open out into a fluid port. Compared to conventional solutions, in which a fluid channel connects only two cylinders, which are situated on different planes, to one another, the total number of closure elements to be provided may therefore be reduced by virtue of the fact that, as described above, three or more cylinders disposed on different planes are connected to one another by means of a single fluid channel running in a straight line.

Two cylinders of the same set that are disposed in adjacent planes may have an angular distance from one another in relation to the receiving bore for the eccentric shaft. In other words, the individual cylinders of a set need not be disposed congruently one behind the other. A specific angular offset of cylinders disposed on adjacent planes enables for example a denser packing of the individual planes and cylinders (in the style of a hexagonally dense packing) and hence smaller housing dimensions. For example, in the case of such an angular distance of cylinders disposed on adjacent planes, the distance between two adjacent planes may be selected smaller than the maximum diameter of a cylinder.

Within an individual plane the two cylinders may lie approximately opposite one another. Thus, within an individual plane the angular distance of the two cylinders disposed in this plane may be approximately at least 135° in relation to the receiving bore for the eccentric shaft. An angular distance of approximately 150° for example has proved advantageous.

According to a further aspect, a piston pump assembly group is provided, which besides the previously described piston pump housing additionally comprises pump pistons accommodated in the cylinders of the housing as well as an eccentric shaft accommodated in the bore of the housing for actuating the pump pistons. On the eccentric shaft one eccentric per plane may be provided. The eccentrics may either be manufactured integrally with the eccentric shaft or represent separate components. Given three cylinder planes and one eccentric per cylinder plane, the three eccentrics may be disposed relative to one another in angular positions of approximately 0°, 120° and 240° in relation to a longitudinal axis of the eccentric shaft.

Besides the housing, the pistons and the eccentric shaft the piston pump assembly group may additionally comprise a drive for the eccentric shaft. This drive is for example an electric motor. The electric motor may be accommodated in a separate housing that is fastenable to the piston pump housing.

The piston pump assembly group may be part of a motor vehicle brake system. By means of the piston pump assembly group one or more of the systems listed below may be realized: a hydraulic brake booster system, an antilock brake system (ABS), an adaptive cruise control system, a traction control system and a vehicle stability system (also known as an electronic stability program, ESP).

A further aspect is geared to a method of operating a hydraulic pressure generator in a vehicle brake system, wherein the hydraulic pressure generator possesses a piston pump having six cylinders each having one pump piston accommodated therein and wherein the pistons are disposed in pairs in at least three mutually spaced-apart planes. The method comprises the step of actuating the pistons in such a way that a phase displacement between a top dead centre of the one piston and a bottom dead centre of the other piston of one and the same plane is approximately 30° and the minimum phase displacement of the dead centres of pistons of different planes is likewise approximately 30°.

Other advantages of this invention will become apparent to those skilled in the art from the following detailed description of the preferred embodiments, when read in light of the accompanying drawings.

DETAILED DESCRIPTION OF THE INVENTION

There now follows a description of a pressure generator in the form of an exemplary multi-piston pump having six cylinder/piston arrangements and the use thereof in a hydraulic vehicle brake system. The presented pressure generator supplies the hydraulic pressure needed for the wheel-specific control of four wheel brakes and is a component part of an ESP system with integrated ABS functionality. In a departure from the presented embodiments, the pressure generator might of course alternatively comprise for example eight or more cylinder/piston arrangements. Furthermore, the pressure generator might alternatively be used in an electrohydraulic vehicle brake system and for other or additional purposes (such as for a hydraulic brake booster system).

Figure 1:
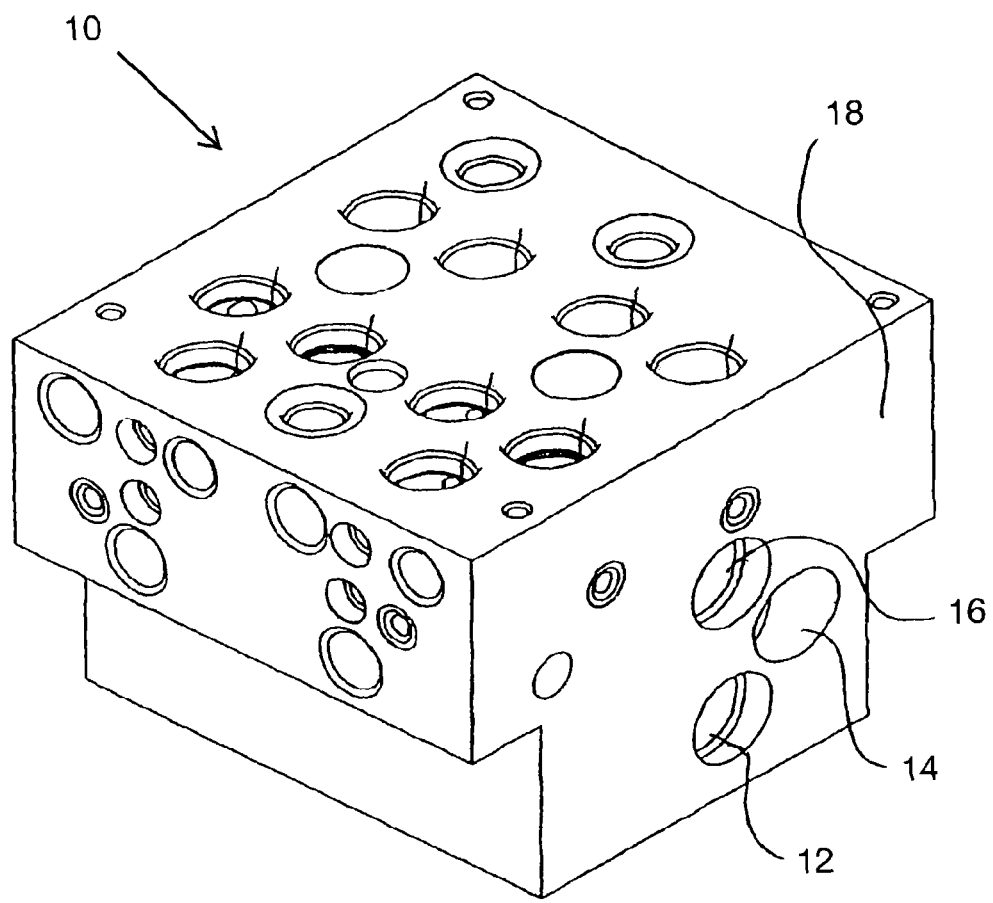
FIG. 1 is a perspective view of an embodiment of a piston pump housing.

FIG. 1 shows a perspective view of a piston pump housing 10 of the pressure generator. The housing 10 comprises a solid aluminium block, into which a plurality of different bores have been introduced. The individual bores are intended for different purposes. Thus, some of the bores are used as fluid channels and others to receive hydraulic valves. A total of six further bores function as cylinders for receiving one pump piston each. In the perspective view according to FIG. 1 three such cylinders 12, 14, 16 are represented. The represented cylinders 12, 14, 16 open out into corresponding openings at the front 18 of the cylinder block 10. Three further such cylinders open out into corresponding openings at the rear (not visible in FIG. 1) of the housing 10.

Figure 2:
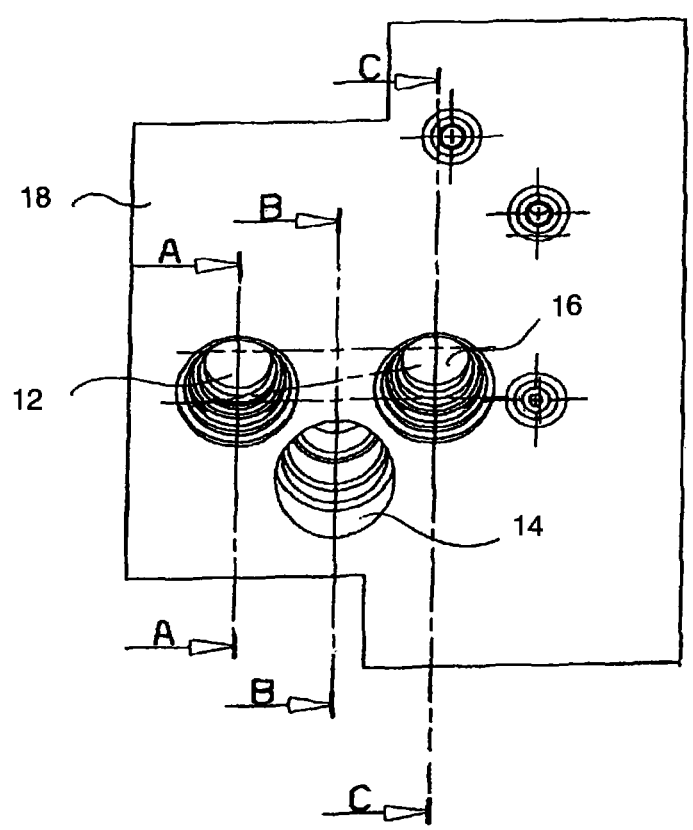
FIG. 2 is a side view of the housing according to FIG. 1.
Figure 3A:
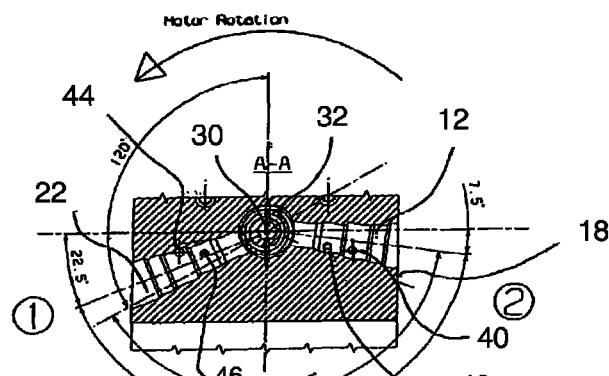
FIGS. 3a to 3c are three sectional views of the housing according to FIG. 1 along the lines A-A, B-B and C-C in FIG. 1.
Figure 3B:
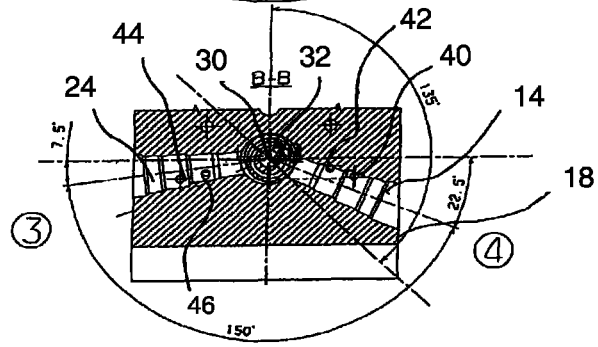
Figure 3C:
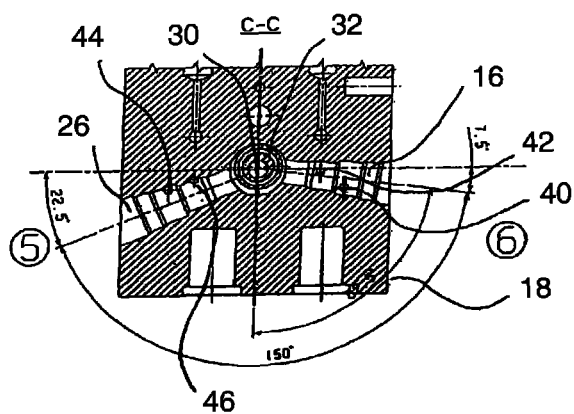

FIG. 2 shows a view of the front 18 of the housing 10 with the three cylinders 12, 14 and 16 that open out into the front 18. In FIG. 2 three section lines A-A, B-B and C-C are represented. The sectional views corresponding to these section lines are illustrated in FIGS. 3a, 3b and 3c. As these figures reveal, there corresponds to each sectional view a plane extending at right angles to the front 18 according to FIG. 2 and having in each case two cylinders disposed therein. Thus, the cylinder 12 and a further cylinder 22 lie in the plane according to FIG. 3a that extends through the section line A-A. In a corresponding manner, the two cylinders 14 and 24 lie in the plane according to FIG. 3b that extends through the section line B-B and the cylinders 16 and 26 lie in the plane according to FIG. 3c that extends through the section line C-C.

The three planes depicted in FIGS. 3a, 3b and 3c are penetrated by a bore 30 that extends at right angles to these planes. In the bore 30 an eccentric shaft 32 is accommodated. The eccentric shaft 32 possesses one eccentric per plane, which eccentric in the embodiment is formed integrally with the shaft.

As is evident from FIGS. 3a, 3b and 3c, each of the cylinders 12, 14, 16, 22, 24 and 26 opens out into the receiving bore 30. For this reason, the pump pistons that are to be accommodated in the cylinders 12, 14, 16, 22, 24 and 26 may in a known manner interact with the eccentrics. As a result of this interaction each individual piston alternately executes a delivery stroke and a return stroke. A delivery stroke denotes a stroke, during which the piston reduces the volume of a displacement space in one of the cylinders 12, 14, 16, 22, 24 and 26 and hence pushes hydraulic fluid out of the housing 10. During a return stroke, on the other hand, the volume of the displacement space is increased again and hydraulic fluid is sucked into the housing 10.

The six cylinders 12, 14, 16, 22, 24 and 26 are divided into two cylinder sets. A first set is formed by the cylinders 12, 14 and 16 that are situated on the right side in FIGS. 3a, 3b and 3c. The remaining cylinders 22, 24 and 26 on the left side form a second cylinder set. Each cylinder set therefore comprises three individual cylinders.

The three cylinders of each cylinder set are connected to one another by means of fluid channels that run in a straight line. More precisely, two fluid channels 40, 42 connect the cylinders 12, 14 and 16. Two further fluid channels 44, 46, on the other hand, connect the three cylinders 22, 24 and 26. In each case two of this total of four fluid channels 42, 46 open out into fluid inlets in order to suck in fluid during a return stroke, while the two remaining fluid channels 40, 44 open out into fluid outlets, out of which the hydraulic fluid displaced by the pistons is pushed. One end of each of the fluid channels 40, 42, 44 and 46 therefore opens out into a fluid port. The in each case opposite end, on the other hand, is either designed in the manner of a blind hole or closed by means of a separate closure element (not represented).

The total of six cylinders 12, 14, 16, 22, 24 and 26 are therefore connected to one another by means of a total of only four fluid channels 40, 42, 44, 46, which may be formed in a simple manner by merely four bores in the housing 10. Furthermore, four closure elements are sufficient to close off the four fluid channels 40, 42, 44 and 46 in a fluid-tight manner. Thus, compared to other piston pumps having six cylinder/piston arrangements that are apportioned to only two planes, in the piston pump of the embodiment markedly fewer fluid channels have to be formed, which speeds up manufacture and makes it more economical. Furthermore, fewer closure elements are to be provided, which likewise makes manufacture more advantageous and moreover reduces the susceptibility to leakage. A further advantage of the piston pump according to the embodiment is that the total of six cylinder/piston arrangements may be apportioned to three planes, so that each individual eccentric interacts with only two pistons. Thus, compared to other multi-piston pumps, in which six cylinder/piston arrangements are apportioned to only two planes, the wear between eccentric and piston foot is reduced. The efficiency of the piston pump is moreover increased.

As becomes clear from a comparison of the plane according to FIG. 3a with the plane according to FIG. 3b and from a comparison of the plane according to FIG. 3b with the plane according to FIG. 3c, two cylinders of the same cylinder set that are disposed in adjacent planes have in each case an angular distance of 15° from one another. This angular distance of 15° arises from the difference of the inclinations of the cylinders 12, 14, 16, 22, 24 and 26 relative to the horizontal. Thus, the inclination of the cylinder 12 relative to the horizontal is 7.5° (cf. FIG. 3a), while the inclination of the cylinder 14 relative to the horizontal amounts to 22.5° (cf. FIG. 3b). The angular distance between the cylinders 12 and 14 is therefore 15°.

The angular distance between cylinders of the same cylinder set that are disposed on adjacent planes enables a denser packing of the cylinder bores. This fact is evident for example from FIG. 2. The adjacent planes indicated there by the lines A-A and B-B are at a distance from one another that is smaller than the maximum diameter of each of the cylinders 12, 14 and 16. In other words, the minimum distance between the two cylinders 12 and 16 is smaller than the maximum diameter of the cylinder 14.

As is further evident from FIGS. 3a, 3b and 3c, the two cylinders 12 and 22 or 14 and 24 or 16 and 26 that are disposed in each case in one plane lie approximately opposite one another. In the embodiment, the (smallest) angular distance between the not directly opposite cylinders of each of these cylinder pairs is 150°. It would however also be conceivable to increase the angular distance to 180° or reduce the angular distance to approximately 135°. The approach of providing the two cylinders, which are disposed in one plane, approximately opposite one another enables a further reduction of the housing volume particularly in comparison to conventional multi-piston pumps having three or more cylinders per plane that are arranged in a star-shaped manner.

Figure 4:
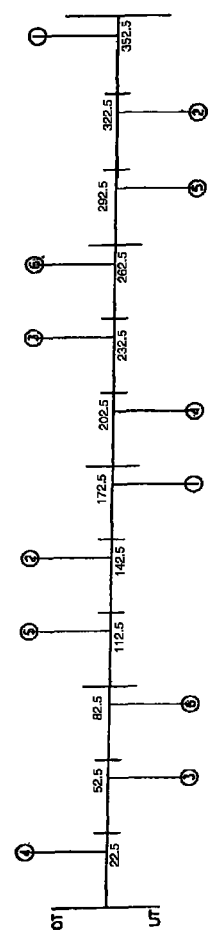
FIG. 4 is a diagrammatic representation of the phase displacement of top and bottom dead centres of pump pistons inserted into the housing according to FIG. 1.

FIG. 4 is a schematic diagram representing the phase displacement between a top dead centre (OT) and a bottom dead centre (UT) of the pistons, which are to be disposed in the cylinders 12, 14, 16, 22, 24 and 26, during their interaction with the eccentrics. The reference character 1 in this case denotes the piston (not represented in FIG. 3a) in the cylinder 22. In a corresponding manner, 2 stands for the piston in the cylinder 12, 3 for the piston in the cylinder 24, 4 for the piston in the cylinder 14, 5 for the piston in the cylinder 26, and 6 for the piston in the cylinder 16.

In the graphic representation according to FIG. 4 it is assumed that the angular positions of the cylinders 12, 14, 16, 22, 24 and 25 are as represented in FIGS. 3a, 3b and 3c. It is further assumed that the angular offset between the three eccentrics on the eccentric shaft 32 is in each case 120°. If therefore the angular position of the eccentric shown in FIG. 3a is defined as 0°, the eccentric according to FIG. 3b has an angular position of 120° and the eccentric according to FIG. 3c an angular position of 240°.

The effect achieved by the selection of the angular alignments that is represented in FIGS. 3a, 3b and 3c is that the phase displacement, given the direction of rotation of the eccentric shaft 32 that is indicated at the top of FIG. 3a, between a top dead centre of the one piston and a bottom dead centre of the other piston of one and the same plane is 30°. Thus, piston 4 reaches its top dead centre at 22.5° and the piston 3 disposed in the same plane reaches its bottom dead centre at 52.5°. The phase displacement is therefore 30°. The same phase displacement exists between the bottom dead centre of the piston 6) (82.5° and the top dead centre of the piston 5 disposed in the same plane) (112.5° as well as between the top dead centre of the piston 2)(142.5° and the bottom dead centre of the piston 1 disposed in the same plane)(172.5° and vice versa.

It is moreover evident from FIG. 4 that the minimum phase displacement of dead centres of the pump pistons of different planes is likewise 30°. Thus, the piston 3 reaches its bottom dead centre at 52.5° and the piston 6 of the adjacent plane reaches its bottom dead centre at 82.5°. The same applies to the two top dead centres of the pistons 5 and 2, the two bottom dead centres of the pistons 1 and 4, the two top dead centres of the pistons 3 and 6, the two bottom dead centres of the pistons 5 and 2, and the two top dead centres of the pistons 1 and 4.

The overall effect achieved by the selection of the phase displacement of the top and bottom dead centres that is represented in FIG. 4 is an advantageous damping of pressure pulsations in the manner of a 12-piston pump.

Figure 5:
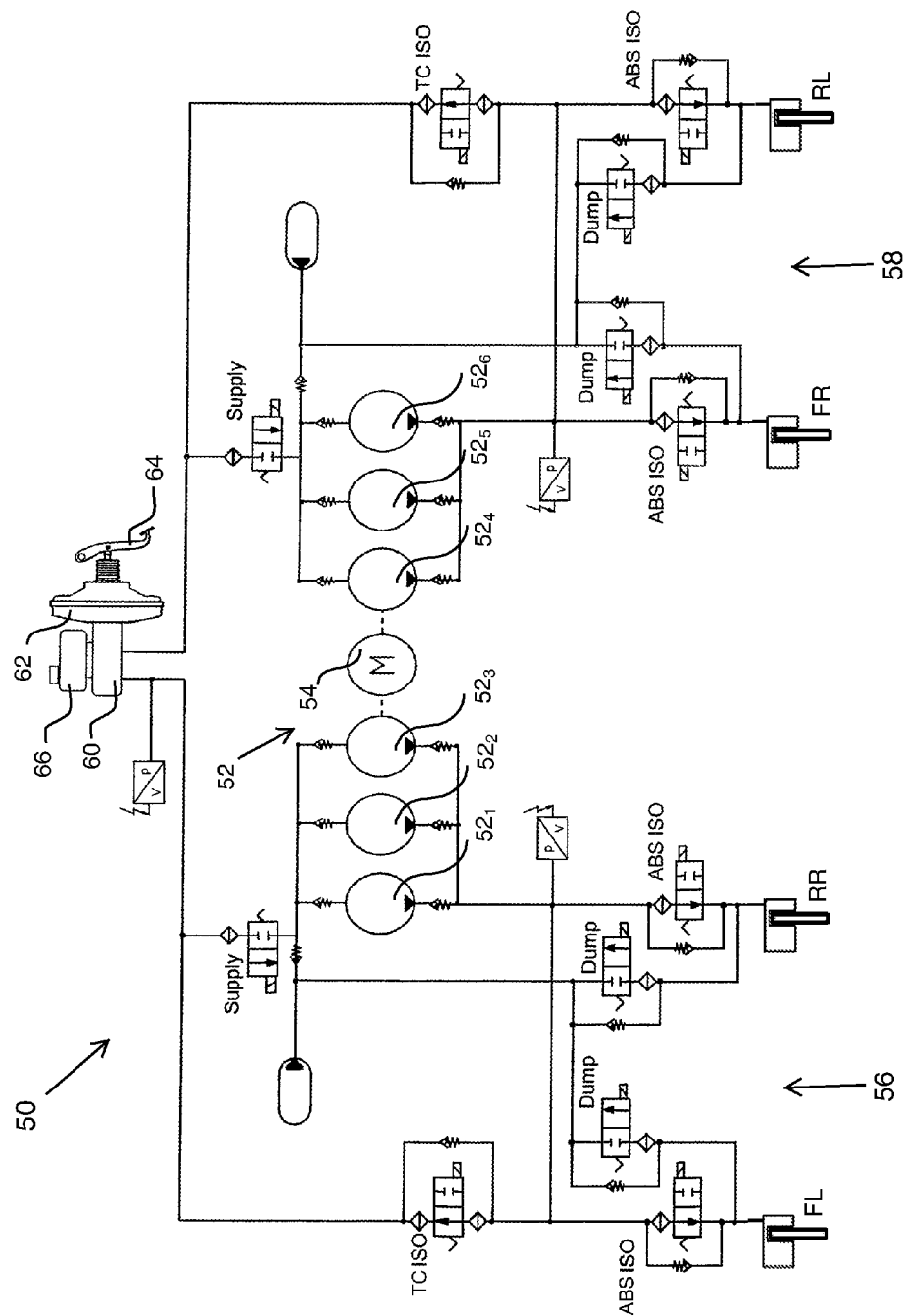
FIG. 5 is a diagrammatic representation of the arrangement of a piston pump comprising the housing according to FIG. 1 in a vehicle brake system.

FIG. 5 shows a diagrammatic representation of a two-circuit vehicle brake system 50, in which the multi-piston pump described with reference to FIGS. 1 to 4 is used. The pressure generator 52 comprises six cylinder/piston arrangements $52_1, 52_2, 52_3, 52_4, 52_5$ and $52_6$ as well as a drive motor 54. The drive motor 54 is an electric motor that drives the eccentric shaft 32 represented in FIGS. 3a, 3b and 3c.

The two brake circuits of the vehicle brake system 50 correspond to a diagonal split, whereby a first brake circuit 56 comprises the left front wheel FL and the right rear wheel RR and a second brake circuit 58 comprises the right front wheel FR and the left rear wheel RL. Both brake circuits 56, 58 are coupled during a service braking operation by a two-circuit master cylinder 60 and a vacuum brake booster 62 to a brake pedal 64. During the service braking operation the valves TC ISO and ABS ISO are open so that fluid may pass from a reservoir 66 into the master cylinder 60 and from there, upon an actuation of the pedal 64, to the four wheel brakes FL, RR, FR and RL.

During an ABS operation, by means of an interplay of fluid pressure increases and pressure reductions brought about by means of the pressure generator 52 (by opening the "dump" valves) an ABS control intervention is implemented. In the case of implementation of a control intervention that increases the traction (traction control, TC) or a vehicle dynamics control operation (ESP or vehicle stability control, VSC) the master cylinder 60 is separated from the wheel brakes FL, RR, FR and RL by closing the valves TC ISO and a fluid pressure is supplied to one or more of the wheel brakes FL, RR, FR and RL by means of the pressure generator 52.

As already explained above, FIGS. 1 to 5 represent exemplary embodiments. It is within the discretion of the person skilled in the art to modify these embodiments within the scope of the accompanying claims.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Piston pump housing for a hydraulic pressure generator in a vehicle brake system, comprising
    a bore for receiving an eccentric shaft; and
    at least six cylinders for receiving one pump piston each, wherein the cylinders are disposed in pairs in at least three mutually spaced-apart planes and open out in each case into the bore, wherein a distance between two adjacent planes is smaller than a maximum diameter of each of the at least six cylinders.

2. Piston pump housing according to claim 1, wherein the six cylinders are divided into two sets, wherein in each case three cylinders disposed on different planes form a set.

3. Piston pump housing according to claim 1, wherein at least one fluid channel runs in a straight line and connects at least three cylinders, which are disposed on different planes to one another.

4. Piston pump housing according to claim 2, wherein at least two fluid channels running in a straight line are provided, wherein a first fluid channel connects the cylinders of a first set to one another and a second fluid channel connects the cylinders of a second set to one another.

5. Piston pump housing according to claim 4, wherein each fluid channel is closed at a first end by a closure element and opens out at a second end into a fluid port.

6. Piston pump housing according to claim 2, wherein two cylinders of the same set that are disposed in adjacent planes have an angular distance from one another at right angles to the bore.

7. Piston pump housing according to claim 1, wherein the two cylinders disposed in a plane lie approximately opposite one another.

8. Piston pump housing according to claim 1, wherein within a plane an angular distance of the two cylinders disposed in the plane is approximately at least 135° in relation to the bore.

9. Piston pump housing according to claim 8, wherein within a plane the angular distance of the two cylinders disposed in the plane is approximately 150° in relation to the bore.

10. Piston pump housing according to claim 2, wherein the first set of cylinders is associated with a first brake circuit and the second set of cylinders is associated with a second brake circuit.

11. Piston pump assembly group, comprising
    the piston pump housing according to claim 1;
    pump pistons accommodated in the cylinders of the housing; and
    an eccentric shaft accommodated in the bore of the housing for actuating the pump pistons.

12. Piston pump assembly group according to claim 11, wherein on the eccentric shaft one eccentric per plane is provided such that three eccentrics are disposed relative to one another in angular positions of approximately 0°, 120° and 240° in relation to an axis of the eccentric shaft.

13. Piston pump assembly group according to claim 12, further comprising an electromotive drive for the eccentric shaft.

14. Motor vehicle brake system, comprising: a piston pump housing having—a bore for receiving an eccentric shaft; and at least six cylinders for receiving one pump piston each, wherein the cylinders are disposed in pairs in at least three mutually spaced-apart planes and open out in each case into the bore; and wherein a distance between two adjacent planes is smaller than a maximum diameter of each of the at least six cylinders; the pump pistons accommodated in the cylinders of the housing; and the eccentric shaft accommodated in the bore of the housing for actuating the pump pistons.

15. Method of operating a hydraulic pressure generator in a vehicle brake system, wherein the hydraulic pressure generator possesses a piston pump having six cylinders each having one pump piston accommodated therein and wherein the pump pistons are disposed in pairs in at least three mutually spaced-apart planes, and wherein a distance between two adjacent planes is smaller than a maximum diameter of each of the at least six cylinders, the method comprising the step of actuating the pump pistons in such a way that a phase displacement between a top dead center of the one piston and a bottom dead center of the other piston of one and the same plane is approximately 30° and a minimum phase displacement of dead centers of the pump pistons of different planes is likewise approximately 30°.

16. Piston pump housing according to claim 3, wherein each fluid channel is closed at a first end by a closure element and opens out at a second end into a fluid port.

17. Piston pump housing according to claim 1, wherein the pairs of cylinders of adjacent planes are disposed in a circumferential direction of the bore at an angular distance from one another.

* * * * *